US010983262B2

(12) United States Patent
Tam et al.

(10) Patent No.: US 10,983,262 B2
(45) Date of Patent: Apr. 20, 2021

(54) ROTATIONAL GEOMETRIC PHASE HOLOGRAM WITH APPLICATION FOR FABRICATING GEOMETRIC PHASE OPTICAL ELEMENT

(71) Applicant: Hong Kong Applied Science and Technology Research Institute Company Limited, Hong Kong (CN)

(72) Inventors: Ming Wai Alwin Tam, Hong Kong (CN); Xiuling Zhu, Hong Kong (CN); Kin Lung Chan, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 274 days.

(21) Appl. No.: 16/136,371

(22) Filed: Sep. 20, 2018

(65) Prior Publication Data
US 2020/0096689 A1    Mar. 26, 2020

(51) Int. Cl.
| | | |
|---|---|---|
| *G02B 5/32* | (2006.01) | |
| *G02B 27/28* | (2006.01) | |
| *G02B 5/30* | (2006.01) | |
| *G03H 1/02* | (2006.01) | |
| *G03H 1/04* | (2006.01) | |

(52) U.S. Cl.
CPC ............. *G02B 5/32* (2013.01); *G02B 5/3091* (2013.01); *G02B 27/286* (2013.01); *G03H 1/02* (2013.01);
(Continued)

(58) Field of Classification Search
CPC ...... G02B 5/32; G02B 27/286; G02B 5/3091; G02B 27/4261; G02B 5/3016; G03H 1/02;
(Continued)

(56) References Cited

U.S. PATENT DOCUMENTS

| 5,032,009 A | 7/1991 | Gibbons et al. |
| 5,602,661 A | 2/1997 | Schadt et al. |
| (Continued) | | |

FOREIGN PATENT DOCUMENTS

| CN | 103959150 A | 7/2014 |
| CN | 105229499 A | 1/2016 |
| (Continued) | | |

OTHER PUBLICATIONS

A. M. W. Tam et al., "Bifocal optical-vortex lens with sorting of the generated non-separable spin-orbital angular-momentum states," Phys. Rev. Appl., vol. 7, 034010 (2017).
(Continued)

*Primary Examiner* — Robert E. Tallman
(74) *Attorney, Agent, or Firm* — Spruson & Ferguson (Hong Kong) Limited

(57) ABSTRACT

A rotational geometric phase hologram has geometric phase optical elements (GPOEs) serially cascaded along a common optical axis to form a GPOE cascade used for receiving a linearly-polarized light beam and generating output light beams at an exit surface of the last GPOE. Interference occurred in the output light beams creates a polarization interference pattern on the exit surface. A photoalignment substrate, when positioned in close proximity to the exit surface, records the pattern. Advantageously, each GPOE is rotatable about the common optical axis. Respective rotation angles of the GPOEs are determined according to a spatially-varying linear polarization orientation distribution selected to be generated for the polarization interference pattern. Particularly, the respective rotation angles are reconfigurable to provide the periodicity required for the spatially-varying linear polarization orientation distribution over a range of allowed periodicities while keeping the periodicity (Continued)

of spatially-varying optic axis orientation distribution of each GPOE to be fixed.

17 Claims, 6 Drawing Sheets

(52) U.S. Cl.
CPC ......... *G03H 1/0404* (2013.01); *G03H 1/0465* (2013.01); *G03H 2001/026* (2013.01); *G03H 2001/0439* (2013.01); *G03H 2222/15* (2013.01); *G03H 2222/31* (2013.01); *G03H 2223/50* (2013.01); *G03H 2240/11* (2013.01)

(58) Field of Classification Search
CPC ............... G03H 1/0404; G03H 1/0465; G03H 2240/11; G03H 2001/026; G03H 2001/0439; G03H 2222/31; G03H 2222/15; G03H 2223/50; G03H 1/26; G03H 2001/261; G03H 2240/15
See application file for complete search history.

(56) References Cited

U.S. PATENT DOCUMENTS

| | | | |
|---|---|---|---|
| 9,383,607 B2 * | 7/2016 | Du | G02B 27/286 |
| 2010/0225876 A1 * | 9/2010 | Escuti | G02B 5/3083 349/187 |
| 2012/0188467 A1 * | 7/2012 | Escuti | G02B 27/286 349/1 |
| 2016/0026092 A1 | 1/2016 | Tabirian et al. | |

FOREIGN PATENT DOCUMENTS

| | | |
|---|---|---|
| CN | 107664838 A | 2/2018 |
| CN | 108347597 A | 7/2018 |
| CN | 108401447 A | 8/2018 |

OTHER PUBLICATIONS

J. Kim et al., "Fabrication of ideal geometric-phase holograms with arbitrary wavefronts," Optica, vol. 2, pp. 958-964 (2015).

B. Wei, et al., "Generating Switchable and Reconfigurable Optical Vortices via Photopatterning of Liquid Crystals," Adv. Mater., vol. 26, pp. 1590-1595 (2014).

B. D. Duncan, P. J. Bos, and V. Sergan, "Wide Angle Achromatic Prism Beam Steering for Infrared Countermeasures Applications," Optical Engineering, vol. 42, issue 4, pp. 1038-1047 (2003).

International Search Report and Written Opinion of PCT application No. PCT/CN2018/107634 issued from the International Search Authority dated Jul. 4, 2019.

* cited by examiner

ROTATIONAL GEOMETRIC PHASE HOLOGRAM WITH APPLICATION FOR FABRICATING GEOMETRIC PHASE OPTICAL ELEMENT

LIST OF ABBREVIATIONS 1D one-dimensional
2D two-dimensional
CP circularly-polarized
GP geometric phase
GPH geometric phase hologram
GPL geometric phase lens
GPOE geometric phase optical element
LC liquid crystal
LHCP left handed circularly polarized
LP linearly-polarized
PG polarization grating
QWP quarter wave plate
RHCP right handed circularly polarized
UV ultraviolet

FIELD OF THE INVENTION

The present invention relates to a geometric phase hologram for generating a polarization interference pattern. Particularly, the present invention relates to a rotational geometric phase hologram for providing a selectable spatially-varying polarization orientation distribution by means of rotation of the phase masks.

BACKGROUND

A GPOE, such as a PG and a GPL, is a planar circular polarization-sensitive diffractive optical element that modifies the direction of light propagation. The unique circular polarization-sensitive diffractive property of a GPOE implies that the diffraction, and hence the direction of light propagation, can be modulated by means of altering the handedness of the CP incident wave. As one example of application, a PG is used as a reconfigurable beam steerer for eye tracking in a virtual or augmented reality display (as disclosed by Haiwei CHEN, Yishi WENG, Daming X U, Nelson V. TABIRYAN, and Shin-Tson WU, in "Beam steering for virtual/augmented reality displays with a cycloidal diffractive waveplate," *Opt. Express*, vol. 24, pp. 7287-7298, 2016, the disclosure of which is incorporated herein by reference). The GPOE is characterized by having a spatially-varying optic axis orientation distribution that is predetermined. This predetermined distribution is usually introduced (or written) to the GPOE by the fabrication process depicted in FIG. 1. A first step 101 is to coat a photoalignment layer 115 having photo-aligning molecules onto a substrate 110. In a second step 102, a spatial alignment pattern is formed on the photoalignment layer 115 by illuminating the photoalignment layer 115 with a UV light beam 132 having a predetermined spatially-varying polarization orientation distribution. This UV light beam 132 is obtained by passing a polarized UV light beam through a fixed or computer generated amplitude or phase mask 131, that modulates the polarization orientation of the polarized UV light beam. For information on fixed masks, see: J. KIM et al., "Fabrication of ideal geometric-phase holograms with arbitrary wavefronts," *Optica* vol. 2, pp. 958-964 (2015), the disclosure of which is incorporated herein by reference. For information on computer generated masks, see: B. WEI, et al., "Generating Switchable and Reconfigurable Optical Vortices via Photopatterning of Liquid Crystals," *Adv. Mater.*, vol. 26, pp. 1590-1595 (2014), doi:10.1002/adma.201305198, the disclosure of which is incorporated herein by reference. (As will be mentioned below, one example of the mask 131 is a GPOE mask.) It causes the desired alignment pattern to be recorded on the photoalignment layer 115. In a third step 103, LC molecules 145 are injected onto the photoalignment layer 115. The alignment pattern on the photoalignment layer 115 guides the LC molecules 145 to align such that the desired spatially-varying optic axis orientation distribution over a LC layer 140 formed by the LC molecules 145 is obtained. Thereby a GPOE 120 is formed.

It follows that a major step in fabricating a GPOE is to record a desired alignment distribution onto a photoalignment substrate, which is a substrate having a photoalignment layer thereon, by generating a polarized UV light beam having a desired spatially-varying polarization orientation distribution and then irradiating the photoalignment substrate with the polarized UV light beam. The alignment distribution can be written onto the photoalignment substrate by a variety of methods, such as polarization interference, direct polarization writing, using a digital micromirror device, and using a GPH. Using the GPH has distinct advantages of fast fabrication time, low optical setup complexity and good fabrication quality.

GPOE fabrication via GPH has three fundamental elements: (i) two CP light beams with mutually orthogonal polarizations and at the same power level; (ii) a GPOE as a mask for modifying the phase difference of the two CP light beams; and (iii) a photoalignment substrate for recording a polarization interference pattern of the light beams. Previous works on using a GPH in fabricating a GPOE include U.S. Pat. Nos. 5,602,661 and 9,383,607.

In U.S. Pat. No. 5,602,661, the GPH comprises a patterned retarder, or a GPOE mask, satisfying a half wave condition with respect to an incident LP light beam that is used. The incident LP light beam is rotated according to the pattern retarder or the GPOE mask. The spatial profile of the outgoing LP light beam is recorded on a photoalignment substrate. The rotation is due to interference between the primary and conjugate first-order diffracted waves. However, the periodicity of the fabricated GPOE is always half of the original GPOE mask. In practical situations, it is often required to manufacture GPOEs of different periodicities. The GPH disclosed in U.S. Pat. No. 5,602,661 is not flexible for adaptation to large-scale manufacturing of GPOEs.

In U.S. Pat. No. 9,383,607, the GPH comprises a QWP and a quarter-wave GPOE mask. The incident LP light beam is rotated by an angle that aligns with the spatial alignment distribution of the GPOE mask. The rotation is due to interference between the zeroth-order non-diffracted beam and the first-order diffracted beam as a result of spatial GP modulation. However, the fabricated periodicity of the resultant GPOE is identical to the original GPOE mask. Similar to U.S. Pat. No. 5,602,661, the GPH disclosed in U.S. Pat. No. 9,383,607 results in inflexibility for large-scale manufacture of GPOEs.

In both U.S. Pat. Nos. 5,602,661 and 9,383,607, the period of the GPOE mask determines the periodicity of the fabricated GPOE. The cost of fabricating GPOEs with different periodicities by the GPHs disclosed in these two references is high as different GPOE masks with particular mask periods are required to fabricate GPOEs with different periodicities.

There is a need in the art for a GPH-based technique of fabricating GPOEs of different periodicities while a same set of one or more GPOE masks with fixed periods is used.

Apart from GPOE fabrication, the technique is also useful for other applications that generate polarization interference patterns of different periodicities.

SUMMARY OF THE INVENTION

In a first aspect of the present invention, an apparatus for generating a spatially-varying linear polarization orientation distribution for a polarization interference pattern is provided. The apparatus is provided in a form of rotational GPH.

The apparatus comprises plural GPOEs serially cascaded along a common optical axis to form a GPOE cascade. The GPOE cascade has first and last GPOEs for receiving a LP light beam (equivalent to superposition of RHCP and LHCP light beams of equal strength) at the first GPOE and generating ideally two diffracted first-order output light beams, with orthogonal circular polarization with respect to one another, leaving from an exit surface of the last GPOE. An inventive feature of the apparatus is that each GPOE in the GPOE cascade is rotatable about the common optical axis, whereby each GPOE has a rotation angle measured from a reference axis orthogonal to the common optical axis. Polarization interference occurred in the plurality of output light beams creates a polarization interference pattern on the exit surface. Advantageously, respective rotation angles of the GPOEs in the GPOE cascade are reconfigurable and determined according to the selected spatially-varying linear polarization orientation distribution.

A light source is usually included in the apparatus for providing the LP light beam to the first GPOE. The light source may be arranged such that a polarization orientation of the LP light beam is orthogonal to both the common optical axis and the reference axis. When the LP light beam is monochromatic, each GPOE in the GPOE cascade normally satisfies a half wave condition with respect to a wavelength of the LP light beam.

A processor is generally included in the apparatus for determining the respective rotation angles to achieve a high accuracy.

In the apparatus, a photoalignment substrate may be positioned in close proximity to the exit surface (normally 1 mm or less) for receiving the polarization interference pattern. The photoalignment substrate is configured to record the spatially-varying linear polarization orientation distribution upon irradiated by the plurality of output light beams.

Each GPOE has a spatially-varying optic axis orientation distribution that may vary one-dimensionally with a periodicity. Respective spatially-varying optic axis orientation distributions of the GPOEs may or may not be the same.

Advantageously and preferably, the apparatus further comprises a spatial filtering system for filtering the plurality of output light beams received from the last GPOE to form a plurality of filtered light beams used for creating a second polarization interference pattern having the spatially-varying linear polarization orientation distribution. The spatial filtering system is configured to (1) block, from the plurality of output light beams, unwanted light beams that distort the spatially-varying linear polarization orientation distribution in creating the second polarization interference pattern, and (2) allow two first-order orthogonally CP diffracted light beams contributory to establish the polarization interference pattern to pass. In the apparatus, a photoalignment substrate may be located and arranged to receive the second polarization interference pattern. The photoalignment substrate is configured to record the spatially-varying linear polarization orientation distribution upon irradiated by the plurality of filtered light beams.

In one embodiment, the spatial filtering system comprises a first lens, a first aperture stop, a second aperture stop and a second lens. The first and second lenses have a same focal length given by a first distance. The first lens is located from the last GPOE by the first distance for receiving and directing the plurality of output light beams to the first aperture stop. The first aperture stop is located from the first lens by the first distance, and is configured to block a plurality of higher-order diffracted light beams in the unwanted light beams from reaching the second lens, where each higher-order diffracted light beam has a diffraction order greater than one. The second aperture stop is located between the first aperture stop and the second lens, and is arranged to block a zeroth-order diffracted light beam in the unwanted light beams from reaching the second lens. The second lens is located from the first aperture stop by the first distance for receiving the two first-order diffracted light beams and directing the two first-order diffracted light beams to interfere on a plane located from the second lens by the first distance to thereby generate the second polarization interference pattern.

According to one embodiment of the present invention, it is provided with an apparatus reconfigurable for generating a polarization interference pattern having a spatially-varying linear polarization orientation distribution that varies one-dimensionally with a periodicity selected from a range of allowed periodicities. The apparatus comprises GPOEs serially cascaded along a common optical axis to form a GPOE cascade. The GPOE cascade has first and last GPOEs for receiving a LP light beam at the first GPOE and generating a plurality of CP output light beams exited from an exit surface of the last GPOE, where the plurality of output light beams includes diffracted CP light beams. Each GPOE in the GPOE cascade is rotatable about the common optical axis, and has a rotation angle measured from a reference axis orthogonal to the common optical axis. A spatially-varying optic axis orientation distribution of each GPOE in the GPOE cascade varies one-dimensionally with a periodicity that is fixed and that exhibits odd symmetry. Polarization interference occurred in the plurality of output light beams creates a spatially varying LP beam on the exit surface. In the apparatus, respective rotation angles of the GPOEs in the GPOE cascade are determined according to the spatially-varying linear polarization orientation distribution. The respective rotation angles are reconfigurable to provide the periodicity required for the spatially-varying linear polarization orientation distribution over the range of allowed periodicities while keeping the periodicity of the spatially-varying optic axis orientation distribution of each GPOE in the GPOE cascade to be fixed.

According to another embodiment of the present invention, it is provided with an apparatus for generating a polarization interference pattern with a spatially-varying linear polarization orientation distribution selected such that when the polarization interference pattern is imprinted on a photoalignment substrate and a resultant GPOE is fabricated, the resultant fabricated GPOE is a 2D GPOE exhibiting 2D diffraction. In this embodiment, the apparatus is the same as the one described for the immediately last embodiment except that the spatially-varying optic axis orientation distribution of each GPOE in the GPOE cascade varies one-dimensionally with a periodicity that is fixed and that exhibits even symmetry.

In a second aspect of the present invention, it is provided with a method for recording a spatially-varying linear polarization orientation distribution of a polarization interference pattern onto a photoalignment substrate.

The method comprises serially cascading plural GPOEs along a common optical axis to form a GPOE cascade. The GPOE cascade has first and last GPOEs. Each GPOE in the GPOE cascade is rotatable about the common optical axis and has a rotation angle measured from a reference axis orthogonal to the common optical axis. The method further comprises: determining respective rotation angles of the GPOEs in the GPOE cascade according to the spatially-varying linear polarization orientation distribution; configuring the GPOEs in the GPOE cascade to have the respective rotation angles as determined; and positioning the photoalignment substrate on a location at which the polarization interference pattern is created. Additionally, the method further comprises providing a LP light beam to the first GPOE to generate a plurality of output light beams exited from an exit surface of the last GPOE. The plurality of output light beams directly or indirectly creates the polarization interference pattern, and irradiates the photoalignment substrate such that the photoalignment substrate records the spatially-varying linear polarization orientation distribution.

Preferably, the method further comprises arranging a spatial filtering system to filter the plurality of output light beams received from the last GPOE to form a plurality of filtered light beams used for creating the polarization interference pattern. The spatial filtering system is configured to: (1) block, from the plurality of output light beams, unwanted light beams that distort the spatially-varying linear polarization orientation distribution in creating the polarization interference pattern; and (2) allow two first-order diffracted light beams contributory to creating the polarization interference pattern to pass.

Other aspects of the present invention are disclosed as illustrated by the embodiments hereinafter.

DETAILED DESCRIPTION

A first aspect of the present invention is to provide an apparatus for generating a spatially-varying linear polarization orientation distribution for a polarization interference pattern. The apparatus is provided in a form of rotational GPH. A rotational GPH is a GPH whose GPOE masks are rotatable. As demonstrated hereinafter, the feature of the GPOE masks being rotatable enables the disclosed apparatus to generate polarization interference patterns of different periodicities by using one set of GPOE masks of fixed periods.

One particularly useful application of the disclosed apparatus is to imprint a desired alignment pattern on a photoalignment layer by irradiating the photoalignment layer with the generated polarization interference pattern. It enables subsequent fabrication of a GPOE. Although the disclosed apparatus is particularly useful to the application of imprinting the alignment pattern on the photoalignment layer, the present invention is not limited only to this application. The present invention is applicable to any application that requires generation of a polarization interference pattern with a desired or selected spatially-varying linear polarization orientation distribution.

Figure 1:
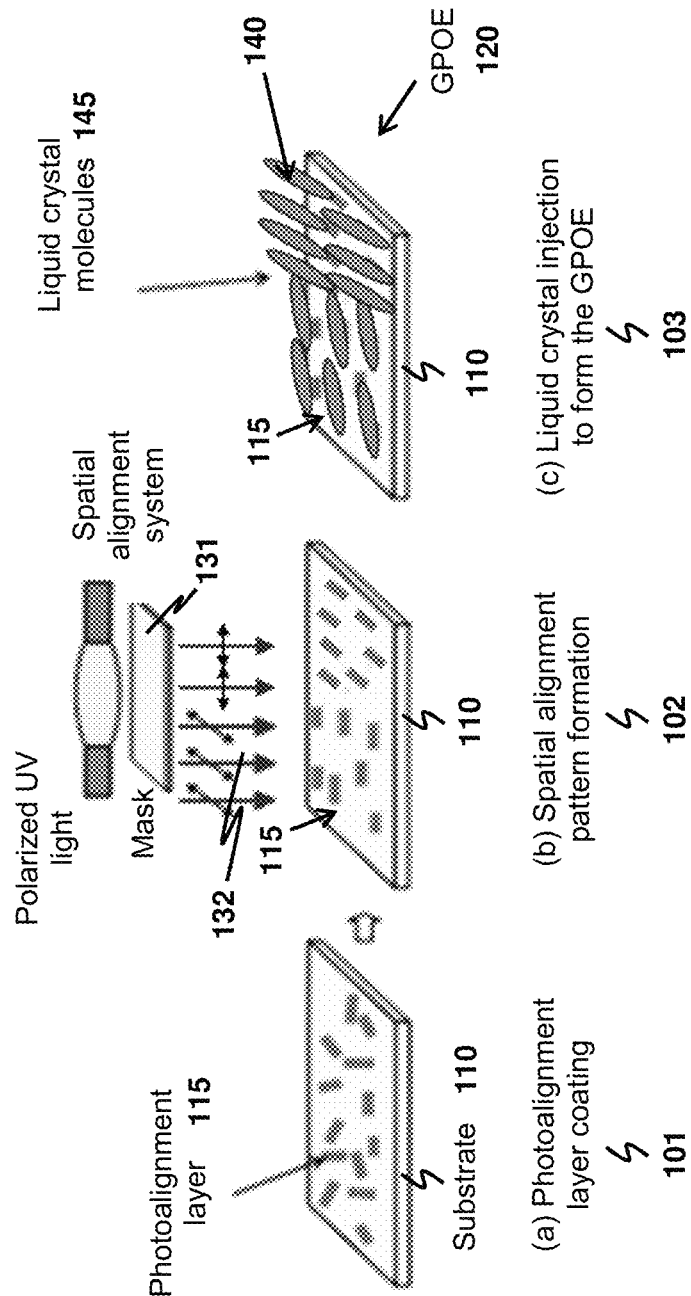
FIG. 1 depicts a typical GPOE fabrication process.
Figure 2:
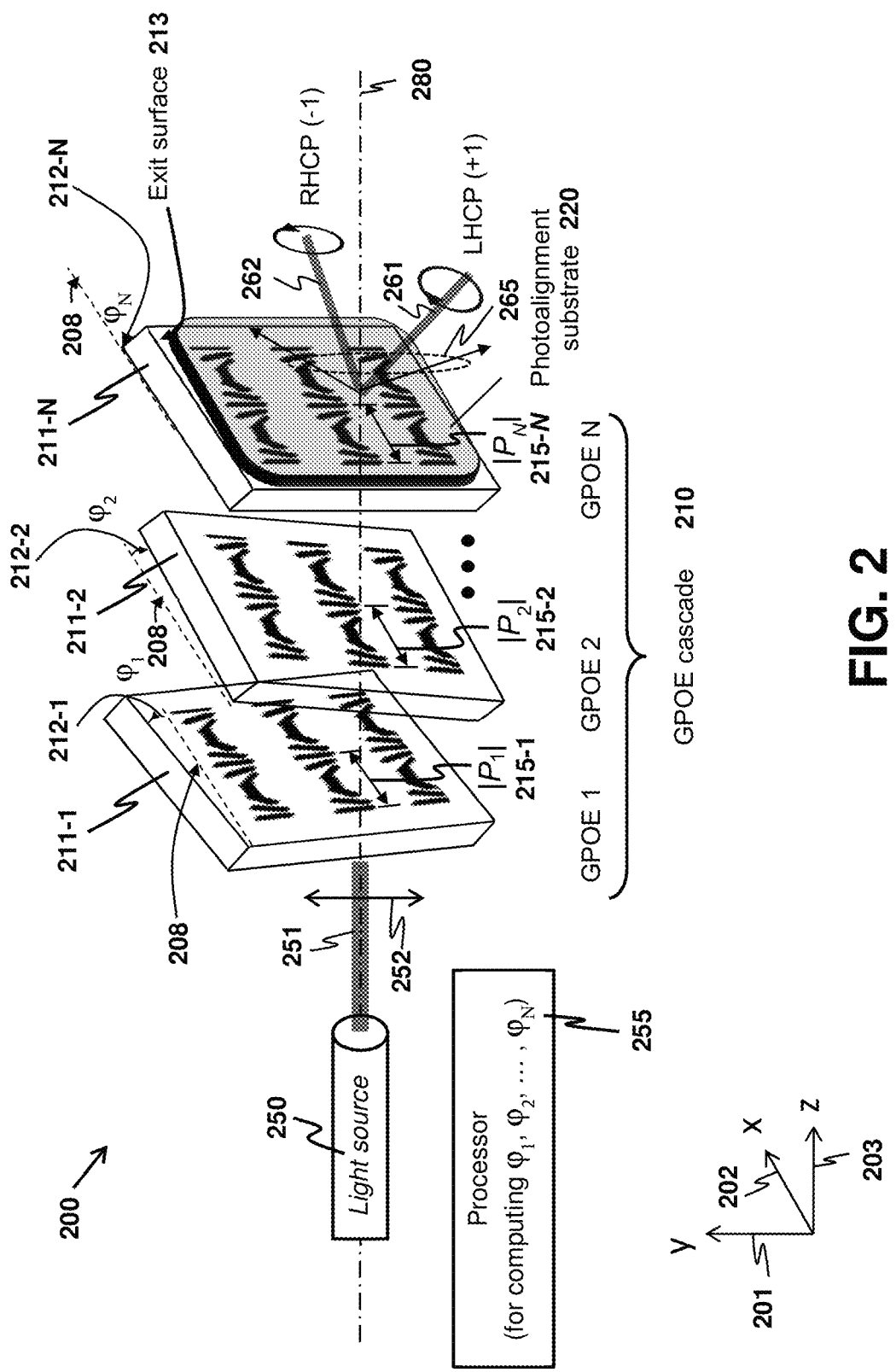
FIG. 2 depicts an exemplary apparatus for generating a polarization interference pattern having a spatially-varying linear polarization orientation distribution.

FIG. 2 depicts an apparatus 200 for generating a polarization interference pattern having a spatially-varying linear polarization orientation distribution in accordance with an exemplary embodiment of the present invention.

The apparatus 200 comprises plural (i.e. at least two) GPOEs 211-1:N serially cascaded along a common optical axis 280 to form a GPOE cascade 210, where N is the number of GPOEs used in the apparatus 200. Note that the GPOE cascade 210 has a first GPOE 211-1 and a last GPOE 211-N. The first GPOE 211-1 is arranged to receive a LP light beam 251 having a polarization orientation 252. Each GPOE in the GPOE cascade 210 may be selected from, e.g., a PG, a GPL, a Q-plate, a fork grating, a bifocal vortex lens and an airy beam generator.

The transmission function of each of the GPOEs 211-1:N can be expressed in matrix form as $$T(x, y) = \cos\left(\frac{\Gamma}{2}\right)I - i\sin\left(\frac{\Gamma}{2}\right)\exp[\pm i2\alpha(x, y)]\sigma, \quad (1)$$

where T(x,y) is the transmission function, $$I = \begin{bmatrix} 1 & 0 \\ 0 & 1 \end{bmatrix}$$

is the identity matrix, $$\sigma = \begin{bmatrix} 1 & 0 \\ 0 & -1 \end{bmatrix}$$

is the circular polarized matrix, r is the retardation, and α(x,y) is the spatially varying optic axis orientation distribution of the LC layer. See: Alwin Ming Wai TAM et al., "Bifocal optical-vortex lens with sorting of the generated non-separable spin-orbital angular-momentum states," *Phys. Rev. Appl.*, vol. 7, 034010 (2017), the disclosure of which is incorporated by reference herein. If the type of GPOE is either a PG or 1D GPL that diffracts the incident beam in the x-direction, the optics axis orientation distribution is $\alpha_{PG}(x)=\pi x/P$ or $\alpha_{GPL}(x)=\pi x^2/2f\lambda$, respectively, where P is the period of the PG, f is the focal length of the GPL and λ corresponds to the incident wavelength. In practical implementation, each of the GPOEs 211-1:N is usually made of birefringent LC. In EQN. (1), the complex exponential, which corresponds to the GP, is governed by the spatial optic axis distribution of the LC layer, and is circular polarization dependent (positive for LHCP and negative for RHCP).

A LC-GPOE exploits the use of spatially-varying GP via different LC orientation in an azimuth plane (viz., a plane perpendicular to an optical axis of the LC-GPOE) to control the shape of the waveform of an incident beam. In addition, the LC-GPOE is circular-polarization sensitive. For example, a PG, directs a CP light beam to a left or right direction according to the handedness of the CP light beam. Furthermore, the expression of σ indicates that when an incident CP light beam having one handedness is transmitted through the LC-GPOE, an outgoing CP light beam has an opposite handedness. That is, if the incident CP light beam is RHCP, the outgoing one is LHCP.

Figure 3:
FIG. 3 depicts examples of resultant LP orientations obtained under different phase differences between two interfering CP light beams.

Consider the LP light beam 251. The LP light beam 251 is equivalent to a superposition of a LHCP light beam and a RHCP light beam of equal strength. The LHCP and RHCP light beams undergo different phase shifts when the two CP light beams pass through the GPOEs 211-1:N. Furthermore, each of the GPOEs 211-1:N has a spatially-varying optic axis orientation distribution. The spatial inhomogeneous optic axis orientation at which the two CP light beams enter an individual GPOE governs the phase shifts made to the two CP light beams. It follows that when the LP light beam 251 passes through the first GPOE 211-1, two CP light beams of opposite handedness leave the first GPOE 211-1. After all the N GPOEs 211-1:N are traveled through, a plurality of output light beams 265 is formed and exits from an exit surface 213 of the last GPOE 211-N. The plurality of output light beams 265 includes two CP light beams of opposite handedness 261, 262 exited from the exit surface 213 at a certain location thereon. Particularly, these two CP light beams 261, 262 are first-order diffracted waves of the last GPOE 211-N, and normally are of equal strength. (As an example shown in FIG. 2, the LHCP light beam 261 is a primary first-order diffracted wave with an order of +1, and the RHCP light beam 262 is a conjugate first-order diffracted wave with an order of −1.) These two CP light beams 261, 262 interfere at the aforesaid certain location of the exit surface 213. As these two CP light beams 261, 262 normally have equal strength, interference of these two CP light beams 261, 262 results in a LP electric field, the polarization orientation of which depends on the phase difference of the two CP light beams 261, 262. FIG. 3 depicts examples of LP orientations under different phase differences between two interfering CP light beams. Since each of the GPOEs 211-1:N usually has an optic axis orientation that is spatially-varying, the linear polarization orientation is in general variant over the exit surface 213. It follows that a polarization interference pattern formed on the exit surface 213 has a spatially-varying linear polarization orientation distribution.

Refer to FIG. 2. An inventive feature of the apparatus 200 is that the GPOEs 211-1:N in the GPOE cascade 210 are individually rotatable about the common optical axis 280. Each GPOE has a rotation angle measured from a reference axis orthogonal to the common optical axis 280. In FIG. 2, the common optical axis 280 is a z-axis 203, and an x-axis 202 is selected as a reference axis 208. Alternatively, a y-axis 201 may also be chosen as the reference axis. The GPOEs 211-1:N have rotation angles $\varphi_1$ 212-1, $\varphi_2$ 212-2, . . . , $\varphi_N$ 212-N, respectively. A distinctive advantage of having the GPOEs 211-1:N individually rotat-able is that the periodicity of the polarization interference pattern is adjustable by choosing appropriate rotation angles 212-1:N.

Consider one application of the apparatus 200 that it is desired to generate the polarization interference pattern with the spatially-varying linear polarization orientation distribution that is variant in one dimension, where the distribution exhibits odd symmetry in this dimension. When the polarization interference pattern is imprinted on a photoalignment substrate 220, the photoalignment substrate has an odd-symmetry alignment distribution in one dimension. The resultant fabricated GPOE is a 1D GPOE. As one example, a PG may be formed by this approach. For convenience in the forthcoming illustration of this application, PGs are selected to be the GPOEs 211-1:N as masks; in practical realizations of this application, GPOEs other than PGs may be used.

In one configuration of the apparatus 200, each of the GPOEs 211-1:N has a spatially-varying optic axis orientation distribution that varies one-dimensionally with a periodicity. Respective spatially-varying optic axis orientation distributions of the GPOEs 211-1:N may or may not be the same. Regardless of whether these distributions are same or different, the GPOEs 211-1:N are required to have their respective spatially-varying optic axis orientation distributions exhibiting odd symmetry, i.e. T(x,y)=−T(−x, y) if this dimension is along the x-axis 202. A rotation by an angle of $\alpha_n$ 212-n, where n∈{1:N}, means that the grating vectors distributed over the n-th GPOE 211-n are also rotated by the angle of $\varphi_n$ 212-n. The spatially-varying linear polarization orientation distribution on the exit surface 213 of the last GPOE 211-N is derived as $$E(x, y) = \begin{bmatrix} \cos\left(\sum_{n=1}^{N} \frac{\pi}{P_n/2\cos(\varphi_n)}x - \frac{\pi}{P_n/2\sin(\varphi_n)}y\right) \\ \sin\left(\sum_{n=1}^{N} \frac{\pi}{P_n/2\cos(\varphi_n)}x - \frac{\pi}{P_n/2\sin(\varphi_n)}y\right) \end{bmatrix} \quad (2)$$

where E(x,y) is an E-field vector at position (x,y) for representing the spatially-varying linear polarization orientation distribution, and $P_n$ is the period of the n-th PG 211-n. The period $P_n$ has a sign, and can be positive or negative. For a positive period, a LHCP/RHCP output beam is deflected to left/right. For a negative period, the LHCP/RHCP output beam is deflected to right/left. The periodicity 215-n of the n-th PG 211-n, where n∈{1:N}, is given by the absolute value of $P_n$.

In one embodiment, two PGs are used with $P_1=-P_2$ and $\varphi_1=-\varphi_2$. The period of the polarization interference pattern, $P_s$, is given by $$P_s = \frac{P}{4\cos(\varphi)} \quad (3)$$

where $P=|P_1|$ and $\varphi=|\varphi_1|$. Hence, the period of the polarization interference pattern, and hence the period of the fabricated device is within P/4 to ∞. That is, the range of allowed periodicities is from P/4 to ∞. This range is considerably wider than the ranges supported by techniques disclosed in U.S. Pat. Nos. 5,602,661 and 9,383,607.

In general, when there are NPGs, the range of allowed periodicities is from $P/2^N$ to ∞. Also note that the polarization interference pattern as generated varies one-dimensionally. Hence, the apparatus 200 is reconfigurable to have different periodicities in the polarization interference pattern by having respective rotation angles of the GPOEs 211-1:N in the GPOE cascade 210 reconfigurable and determined according to the spatially-varying linear polarization orientation distribution selected to be generated for the polarization interference pattern. Note that the different periodicities are selected from a range of allowed periodicities. Also note that a spatially-varying optic axis orientation distribution of each of the GPOEs 211-1:N varies one-dimensionally with a periodicity that is fixed. Hence, the respective rotation angles are reconfigurable to provide the periodicity required for the spatially-varying linear polarization orientation distribution over the range of allowed periodicities while keeping the periodicity of the spatially-varying optic axis orientation distribution of each of the GPOEs 211-1:N in the GPOE cascade 210 to be fixed.

To record the polarization interference pattern, a photoalignment substrate 220 is used. The photoalignment substrate 220 is positioned in close proximity to the exit surface 213 (normally 1 mm or less from the exit surface 213) so as to receive the polarization interference pattern. The photoalignment substrate 220 is configured to record the spatially-varying linear polarization orientation distribution upon irradiated by the plurality of output light beams 265. Typically, a closer distance between the photoalignment substrate 220 and the exit surface 213 is better for the photoalignment substrate 220 to accurately record the spatially-varying linear polarization orientation distribution. However, if the last GPOE 211-N is in direct contact with the photoalignment substrate 220, it could result in scratches on the last GPOE 211-N. In practice, therefore, there is typically a thin isotropic protective layer, e.g., a 500 µm glass substrate, or a ~10 µm silicon dioxide layer, on top of a pattern aligned LC/LC polymer layer of the last GPOE 211-N.

Figure 4:
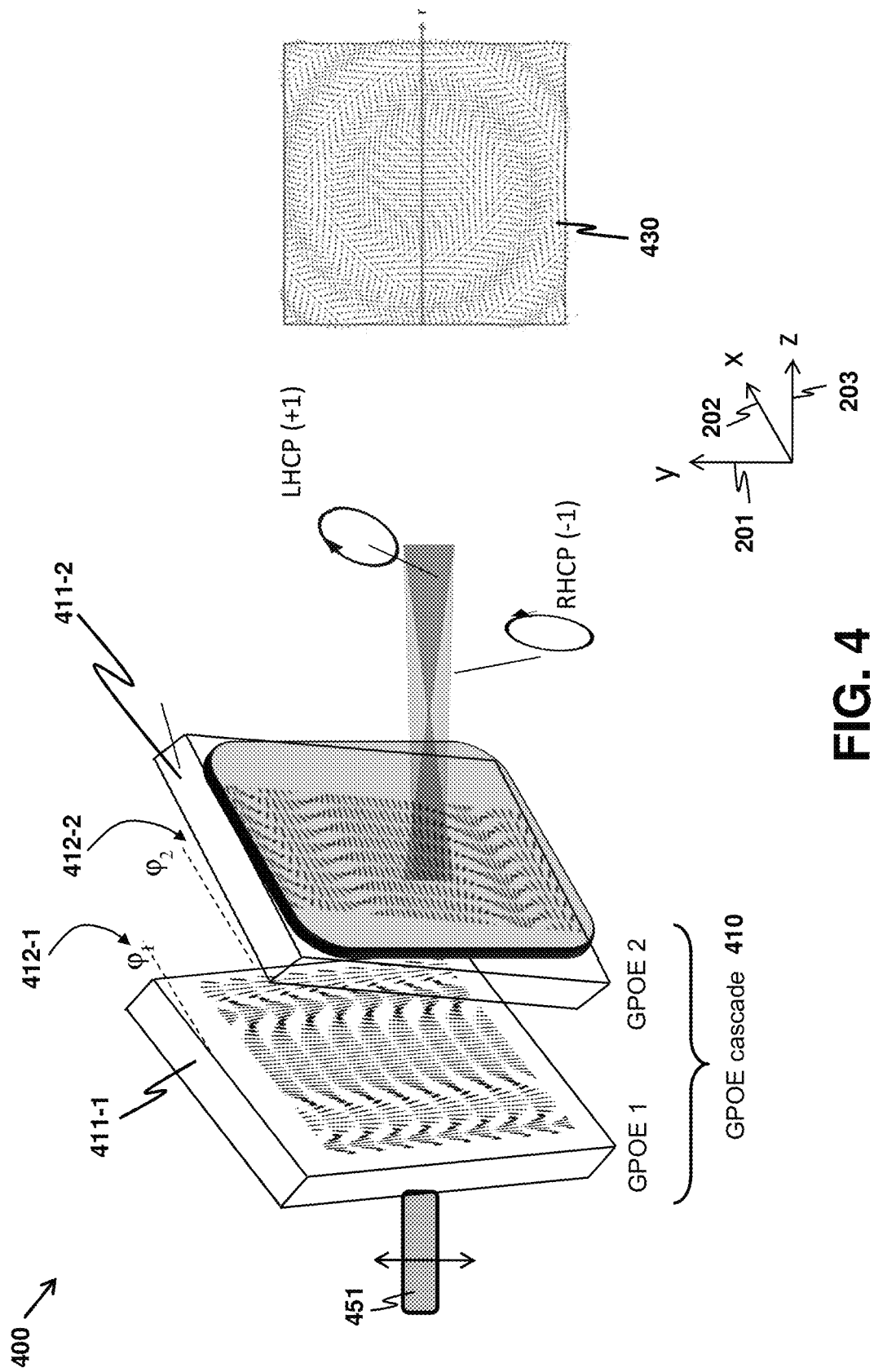
FIG. 4 depicts a corresponding apparatus for generating a polarization interference pattern that varies two-dimensionally in accordance with one embodiment of the present invention, where the polarization interference pattern generated is suitable for fabricating 2D GPOEs.

Consider another application that it is desired to generate a polarization interference pattern with a one-dimensional spatially-varying linear polarization orientation distribution selected such that when the polarization interference pattern is imprinted on a photoalignment substrate and a resultant GPOE is fabricated, the resultant fabricated GPOE is a 2D GPOE (viz., a GPOE exhibiting 2D diffraction). Such application may be used for fabricating, e.g., a GPL, which focuses a CP light beam of one handedness but defocuses another CP light beam having an opposite handedness. FIG. 4 depicts a corresponding apparatus 400 configured to generate such polarization interference pattern in accordance with one embodiment of the present invention. For demonstration, the apparatus 400 is configured to yield a spatially-varying linear polarization orientation distribution used in fabricating an astigmatic GPL having focal lengths controllable by rotating GPOEs in the apparatus 400.

The apparatus 400 is same as the disclosed apparatus 200 as shown in FIG. 2 except that some special conditions on the GPOE cascade are made. The apparatus 400 as depicted in FIG. 4 comprises a GPOE cascade 410 having only two GPOEs, i.e. a first GPOE 411-1 and a last GPOE 411-2. Furthermore, the two GPOEs 411-1:2 are 1D GPOEs having respective spatially-varying optic axis orientation distributions that are periodic and exhibit even symmetry, i.e. T(x,y)=T(−x, y) if the symmetry is along the x-axis 202. For illustration only, the spatially-varying optic axis orientation distributions of the two GPOEs 411-1:2 are positioned to be nearly perpendicular to each other, one along the x-axis 202 and the other along the y-axis 201. In practice, however, the two GPOEs 411-1:2 need not be positioned to be mutually orthogonal as the two GPOEs 411-1:2 are rotatable. Let $\alpha_1(x)$ and $\alpha_2(y)$ be the 1D spatially-varying optic axis orientation distributions of the first GPOE 411-1 and the last GPOE 411-2, respectively, when the two GPOEs 411-1:2 are rotated with respective rotation angles $\varphi_1$ 412-1 and $\varphi_2$ 412-2. As an illustrative example, consider that $\alpha_1(x)$ and $\alpha_2(y)$ are given by $$\alpha_1(x) = \frac{\pi}{2f_1\lambda}[x^2\cos^2\varphi_1 + y^2\sin^2\varphi_1] \qquad (4)$$

and $$\alpha_2(y) = \frac{\pi}{2f_2\lambda}[x^2\cos^2\varphi_2 + y^2\sin^2\varphi_2] \qquad (5)$$

where: $f_1$ and $f_2$ are focal lengths of the first GPOE 411-1 and the last GPOE 411-2, respectively; and $\lambda$ is the wavelength under consideration (viz., the wavelength of an incident LP light beam 451). Illuminating the first GPOE 411-1 with the LP light beam 451 gives rise to a polarization interference pattern 430 that varies two-dimensionally. To record the polarization interference pattern 430, a photoalignment substrate 413 is used. As an example for illustration, the polarization interference pattern 430 depicted in FIG. 4 is given by $$\alpha(x, y) = \frac{\pi}{2(f/2)\lambda}[x^2 + y^2], \qquad (6)$$

computed for $f_1=f_2=f$, $\varphi_1=0°$ and $\varphi_2=90°$. In general, the polarization interference pattern 430 leads to the fabricated GPL that is astigmatic in that different focusing behaviors exhibit for light incident on the x-axis 202 and on the y-axis 201. It can be shown that effective focal lengths for light incident on the x-axis 202 and on the y-axis 201, respectively denoted as $f_x$ and $f_y$, are given by $$f_x = \frac{f_1 f_2}{f_1\cos^2\varphi_2 + f_2\cos^2\varphi_1} \qquad (7)$$

and $$f_y = \frac{f_1 f_2}{f_1\sin^2\varphi_2 + f_2\sin^2\varphi_1}. \qquad (8)$$

Although FIG. 4 depicts that the apparatus 400 has only two GPOEs 411-1:2, it is allowable to have more than two GPOEs as masks in the apparatus 400 to produce the polarization interference pattern 430 that varies two-dimensionally and that is controllable by adjusting rotation angles of the GPOEs. The only requirement is that spatially-varying optic axis orientation distributions of the GPOE masks are periodic and exhibit even symmetry.

Refer to FIG. 2. A light source 250 is usually included in the apparatus 200 for providing the LP light beam 251. The light source 250 is arranged to emit the LP light beam 251 to the first GPOE 211-1. Optionally, the light source 250 is further arranged such that a polarization orientation 252 of the LP light beam 251 is orthogonal to both the common optical axis 280 and the reference axis 208. (As an illustrative example, in FIG. 2, the polarization orientation 252 is a direction in parallel to the y-axis 201.) If the apparatus 200 is used for imprinting an alignment distribution to a photoalignment substrate, the light source 250 is usually configured such that the LP light beam 251 is UV light. In some situations, a visible light is used. The light source 250 is then configured to generate visible light for the LP light beam 251. In most cases, laser is used for generating the polarization interference pattern, and the LP light beam 251 is monochromatic. When the LP light beam 251 is monochromatic with a certain wavelength, normally each of the GPOEs 211-1:N satisfies a half wave condition with respect to the aforementioned wavelength.

Generally, a computing processor 255 is included in the apparatus 200 to determine the rotation angles 212-1:N with a high accuracy. After the rotation angles 212-1:N are determined, one or more actuators (not shown in FIG. 2) are used to position the GPOEs 211-1:N with the respective rotation angles 212-1:N as determined.

As mentioned above, the polarization interference pattern at one location is generated by interfering the two CP light beams 261, 262, which are first-order diffracted waves (one primary and one conjugate) leaving the last GPOE 211-N. However, due to mask imperfection, a typical GPOE produces not only two first-order diffracted light beams but also unwanted light beams. Main components in the unwanted light beams are higher-order diffracted light beams having diffraction orders greater than one, and a zeroth-order leakage (non-diffracted) light beam. It is desirable to filter off these unwanted light beams before generating the polarization interference pattern through the two first-order diffracted light beams.

Figure 5:
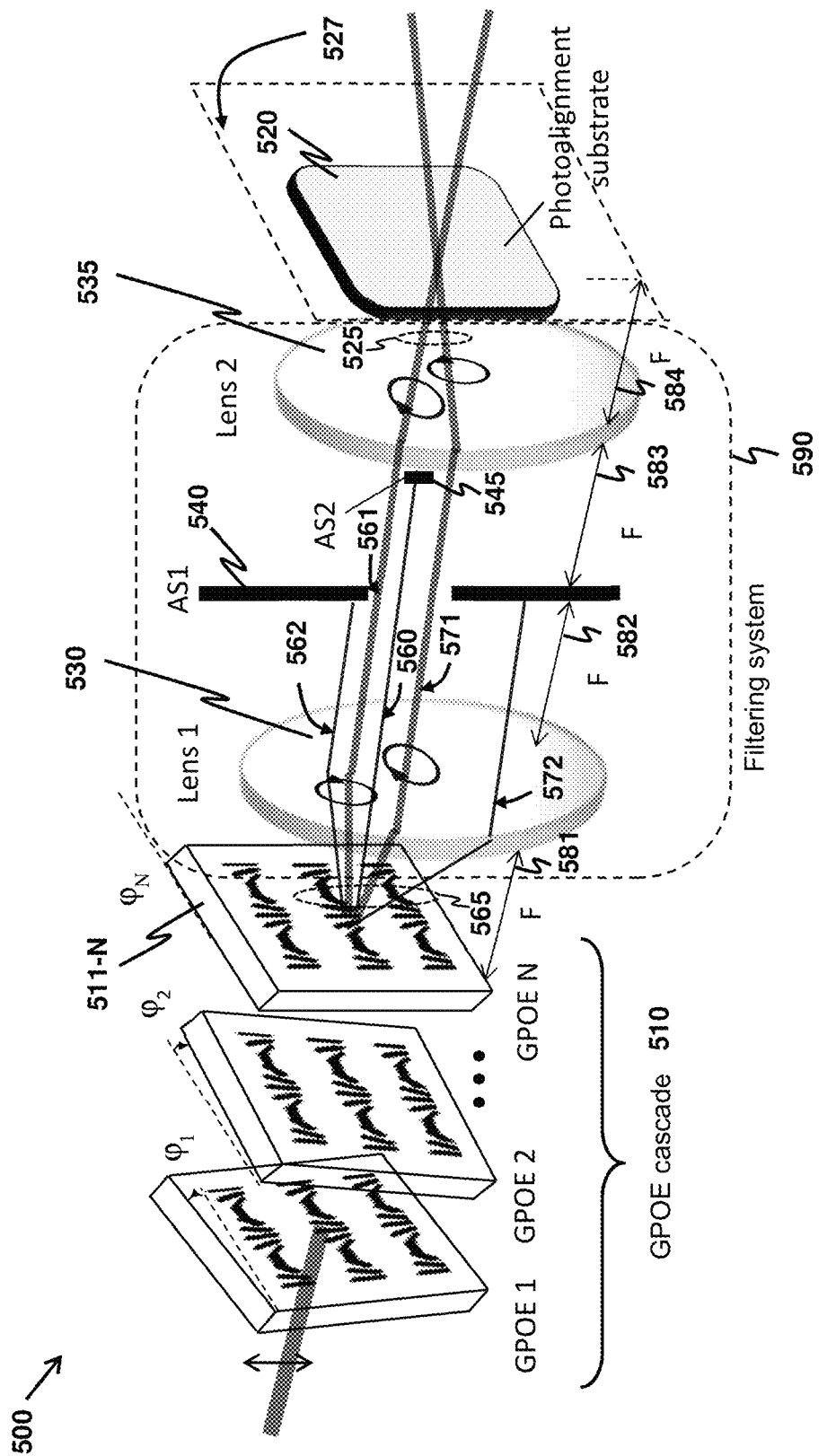
FIG. 5 depicts, in accordance with one embodiment of the present invention, an apparatus for generating a second polarization interference pattern having a spatially-varying linear polarization orientation distribution that is selected or chosen, where the apparatus incorporates a spatial filtering system.

It is preferable and advantageous to provide an improvement to the apparatus 200 by incorporating a spatial filtering system for filtering out the unwanted diffracted order light beams subjected to mask imperfection. FIG. 5 depicts, in accordance with one embodiment of the present invention, an apparatus 500 for generating a second polarization interference pattern having a spatially-varying linear polarization orientation distribution that is selected or chosen, where the apparatus 500 incorporates a spatial filtering system 590. Similar to the apparatus 200 disclosed above, the apparatus 500 includes a GPOE cascade 510 having a last GPOE 511-N, from which a plurality of output light beams 565 exits. The spatial filtering system 590 is used for filtering the plurality of output light beams 565 to form a plurality of filtered light beams 525. The plurality of filtered light beams 525 is used for creating the second polarization interference pattern. In FIG. 5, the second polarization interference pattern is created on a plane 527 coincident with the location of photoalignment substrate 520 and is distant at 4F away from the last GPOE, where F is the focal length of the lens (since the photoalignment substrate 520 is intended to record the spatially-varying linear polarization orientation distribution of the second polarization interference pattern). Specifically, the spatial filtering system 590 is configured to block, from the plurality of output light beams 565, unwanted light beams that distort the spatially-varying linear polarization orientation distribution in creating the second polarization interference pattern while allowing two first-order diffracted light beams 561, 571 contributory to creating the polarization interference pattern to pass.

Details of the operation of the spatial filtering system 590 are given as follows. The plurality of output light beams 565 includes the unwanted light beams and the two first-order diffracted light beams 561, 571. The two first-order diffracted light beams 561, 571 are used to create a polarization interference pattern at a certain location on the last GPOE 511-N as well as the second polarization interference pattern. As mentioned above, the unwanted light beams include a zeroth-order leakage light beam 560 and a plurality of higher-order diffracted light beams 562, 572. The spatial filtering system 590 comprises a first lens 530, a first aperture stop 540, a second aperture stop 545 and a second lens 535. The first and second lens 530, 535 have the same focal length. Denote this focal length as a first distance F. The first lens 530 is located from the last GPOE 511-N by a first separation 581, and is used for receiving and directing the plurality of output light beams 565 to the first aperture stop 540. The first aperture stop 540 is located from the first lens 530 by a second separation 582. The first aperture stop 540 is configured to block the plurality of higher-order diffracted light beams 562, 572 in the unwanted light beams from reaching the second lens 535. The second aperture stop 545 is located between the first aperture stop 540 and the second lens 535. The second aperture stop 545 is arranged to block the zeroth-order leakage light beam 560 in the unwanted light beams from reaching the second lens 535. Hence, the second lens 535 mainly receives the two first-order diffracted light beams 561, 571 with the unwanted light beams being reduced or removed. By focusing light beams received by the second lens 535, the second lens yields and sends out the plurality of filtered light beams 525. The second lens 535 is located from the first aperture stop 540 by a third separation 583 for receiving the two first-order diffracted light beams 561, 571 and directing the two first-order diffracted light beams 561, 571 to interfere on the plane 527 located from the second lens 535 by a fourth separation 584 to thereby generate the second polarization interference pattern. In the spatial filtering system 590, each of the first, second, third and fourth separations 581-584 is equal to the first distance F.

By locating the photoalignment substrate 520 on the aforesaid plane 527, the photoalignment substrate 520 is arranged to receive the second polarization interference pattern. It follows that the photoalignment substrate 520 records the spatially-varying linear polarization orientation distribution upon irradiated by the plurality of filtered light beams 525.

A second aspect of the present invention is to provide a method for recording a spatially-varying linear polarization orientation distribution of a polarization interference pattern onto a photoalignment substrate. The spatially-varying linear polarization orientation distribution is selected to be generated for the polarization interference pattern. The method is easily implemented in practice by using the apparatus disclosed above in the first aspect of the present invention.

Figure 6:
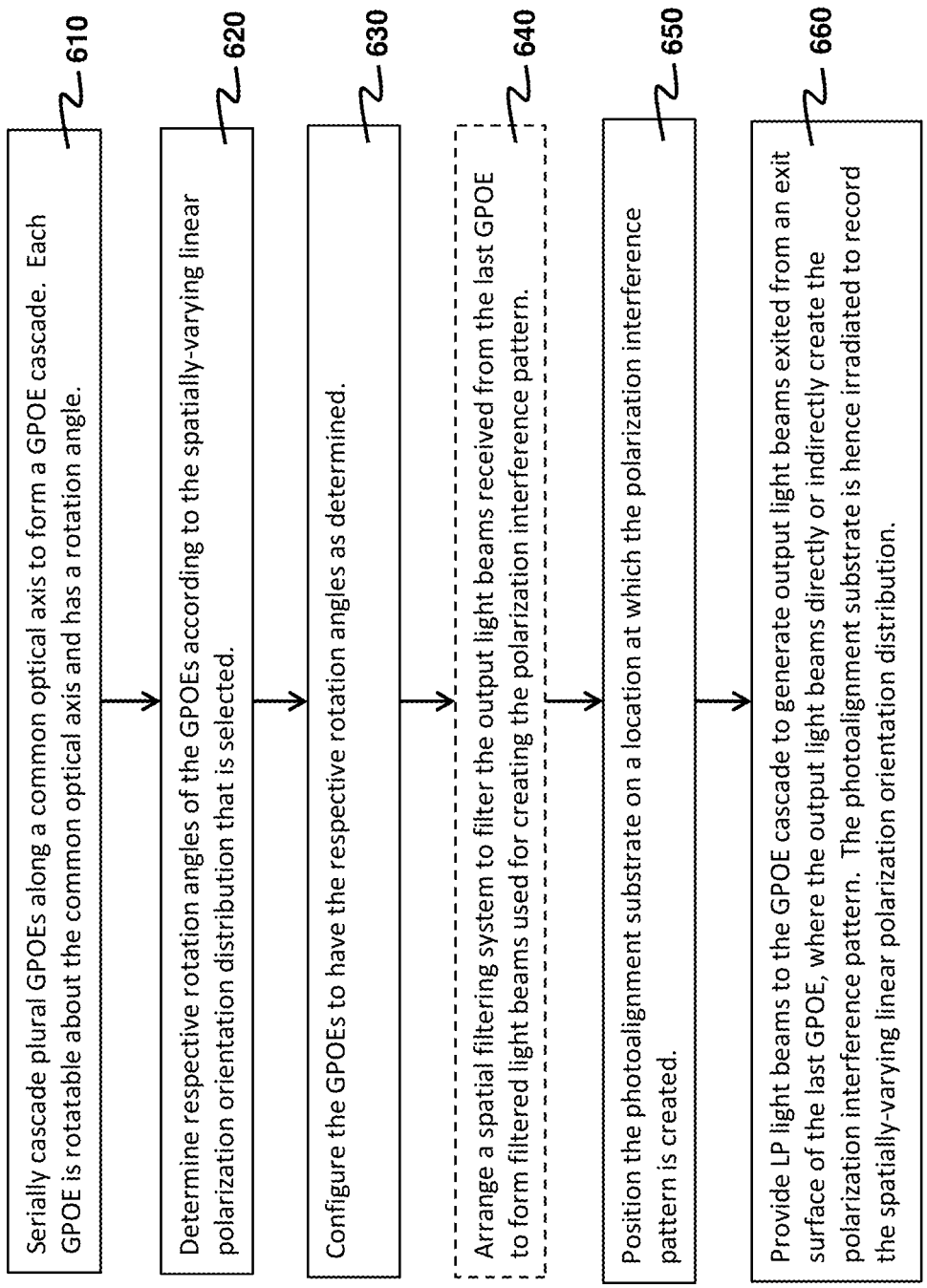
FIG. 6 depicts a flowchart for illustrating a method for recording a spatially-varying linear polarization orientation distribution onto a photoalignment substrate in accordance with one embodiment of the present invention.

The disclosed method is exemplarily described as follows with the aid of FIG. 6, which depicts a flowchart showing the steps involved in a photo-exposure process for recording the spatially-varying linear polarization orientation distribution onto the photoalignment substrate.

In a first step 610, plural GPOEs are serially cascaded along a common optical axis to form a GPOE cascade. In forming the GPOE cascade, each GPOE in the GPOE cascade is made rotatable about the common optical axis. Similar to the apparatus 200 disclosed above, the GPOE cascade has a first GPOE and a last GPOE. The last GPOE is intended to generate a plurality of output light beams. Each GPOE in the GPOE cascade has a rotation angle measured from a reference axis orthogonal to the common optical axis.

In a step 620, respective rotation angles of the GPOEs in the GPOE cascade are determined according to the spatially-varying linear polarization orientation distribution.

In a step 630, the GPOEs in the GPOE cascade are configured to have the respective rotation angles as determined in the step 620.

Optionally, a spatial filtering system is used in a step 640 to filter the plurality of output light beams received from the last GPOE to form a plurality of filtered light beams used for creating the polarization interference pattern. The spatial filtering system is configured to block, from the plurality of output light beams, unwanted light beams that distort the spatially-varying linear polarization orientation distribution in creating the polarization interference pattern. The spatial filtering system is further configured to allow two first-order diffracted light beams contributory to creating the polarization interference pattern to pass.

In a step 650, the photoalignment substrate is positioned on a location at which the polarization interference pattern is created. In the absence of the spatial filtering system, the polarization interference pattern is created on the last GPOE (the exit surface 213 in FIG. 2). In the presence of the spatial filtering system, the polarization interference pattern is created on the plane 527 as shown in FIG. 5.

Afterwards, in a step 660, a LP light beam is provided to the first GPOE to generate the plurality of output light beams. In the absence of the spatial filtering system, the plurality of output light beams directly creates the polarization interference pattern, and irradiates the photoalignment substrate such that the photoalignment substrate records the spatially-varying linear polarization orientation distribution. In the presence of the spatial filtering system, the plurality of output light beams indirectly creates the polarization interference pattern, and also indirectly irradiates the photoalignment substrate to thereby enable the photoalignment substrate to record the spatially-varying linear polarization orientation distribution.

As a remark, the present invention is different from the technique of US2012/0188467 in the following aspect. US2012/0188467 demonstrates that a diffracted steering angle of a CP beam can be adjusted when two or more PGs having a fixed grating period are rotated with respect to one another. In the present invention, differently, rotation angles of GPOEs in a GPOE cascade are reconfigurable and determined according to a spatially-varying linear polarization orientation distribution that is selected to be generated for a polarization interference pattern on the last GPOE of the GPOE cascade.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An apparatus comprising:
plural geometric phase optical elements (GPOEs) serially cascaded along a common optical axis to form a GPOE cascade, the GPOE cascade having first and last GPOEs for generating a plurality of output light beams exited from an exit surface of the last GPOE in response to receiving a linearly-polarized (LP) light beam at the first GPOE, each GPOE in the GPOE cascade being rotatable about the common optical axis and having a rotation angle measured from a reference axis orthogonal to the common optical axis, wherein:
interference occurred in the plurality of output light beams creates a polarization interference pattern on the exit surface;
each GPOE in the GPOE cascade has a spatially-varying optic axis orientation distribution that varies one-dimensionally with a periodicity that exhibits odd or even symmetry; and
respective rotation angles of the GPOEs in the GPOE cascade are reconfigurable and determined according to a spatially-varying linear polarization orientation distribution selected to be generated for the polarization interference pattern.

2. The apparatus of claim 1 further comprising:
a light source for providing the LP light beam to the first GPOE.

3. The apparatus of claim 2, wherein the light source is configured such that the LP light beam is ultraviolet (UV) light.

4. The apparatus of claim 2, wherein the light source is configured such that the LP light beam is visible light.

5. The apparatus of claim 1, wherein the LP light beam is monochromatic.

6. The apparatus of claim 5, wherein each GPOE in the GPOE cascade satisfies a half wave condition with respect to a wavelength of the LP light beam.

7. The apparatus of claim 1 further comprising:
a processor for determining the respective rotation angles.

8. The apparatus of claim 1 further comprising:
a photoalignment substrate in close proximity to the exit surface for receiving the polarization interference pattern, wherein the photoalignment substrate is configured to record the spatially-varying linear polarization orientation distribution upon irradiated by the plurality of output light beams.

9. The apparatus of claim 1, wherein:
respective spatially-varying optic axis orientation distributions of the GPOEs are same.

10. The apparatus of claim 1 further comprising:
a spatial filtering system for filtering the plurality of output light beams received from the last GPOE to form a plurality of filtered light beams used for creating a second polarization interference pattern having the spatially-varying linear polarization orientation distribution, wherein the spatial filtering system is configured to:
block, from the plurality of output light beams, unwanted light beams that distort the spatially-varying linear polarization orientation distribution in creating the second polarization interference pattern; and
allow two first-order diffracted light beams contributory to creating the polarization interference pattern to pass.

11. The apparatus of claim 10 further comprising:
a photoalignment substrate located and arranged to receive the second polarization interference pattern, wherein the photoalignment substrate is configured to record the spatially-varying linear polarization orientation distribution upon irradiated by the plurality of filtered light beams.

12. The apparatus of claim 10, wherein:
the spatial filtering system comprises a first lens, a first aperture stop, a second aperture stop and a second lens, the first and second lens having a same focal length given by a first distance;

the first lens is located from the last GPOE by the first distance for receiving and directing the plurality of output light beams to the first aperture stop;

the first aperture stop is located from the first lens by the first distance;

the second aperture stop is located between the first aperture stop and the second lens; and the second lens is located from the first aperture stop by the first distance for receiving the two first-order diffracted light beams and directing the two first-order diffracted light beams to interfere on a plane located from the second lens by the first distance to thereby generate the second polarization interference pattern.

13. The apparatus of claim 12 further comprising:

a photoalignment substrate located on the plane for receiving the second polarization interference pattern, wherein the photoalignment substrate is configured to record the spatially-varying linear polarization orientation distribution upon irradiated by the plurality of filtered light beams sent out from the second lens.

14. An apparatus comprising:

plural geometric phase optical elements (GPOEs) serially cascaded along a common optical axis to form a GPOE cascade, the GPOE cascade having first and last GPOEs for receiving a linearly-polarized (LP) light beam at the first GPOE and generating a plurality of output light beams exited from an exit surface of the last GPOE, each GPOE in the GPOE cascade being rotatable about the common optical axis and having a rotation angle measured from a reference axis orthogonal to the common optical axis, wherein interference occurred in the plurality of output light beams creates a polarization interference pattern on the exit surface, and respective rotation angles of the GPOEs in the GPOE cascade are reconfigurable and determined according to a spatially-varying linear polarization orientation distribution selected to be generated for the polarization interference pattern; and a spatial filtering system for filtering the plurality of output light beams received from the last GPOE to form a plurality of filtered light beams used for creating a second polarization interference pattern having the spatially-varying linear polarization orientation distribution, wherein the spatial filtering system is configured to:

block, from the plurality of output light beams, unwanted light beams that distort the spatially-varying linear polarization orientation distribution in creating the second polarization interference pattern; and allow two first-order diffracted light beams contributory to creating the polarization interference pattern to pass.

15. The apparatus of claim 14 further comprising:

a photoalignment substrate located and arranged to receive the second polarization interference pattern, wherein the photoalignment substrate is configured to record the spatially-varying linear polarization orientation distribution upon irradiated by the plurality of filtered light beams.

16. The apparatus of claim 14, wherein:

the spatial filtering system comprises a first lens, a first aperture stop, a second aperture stop and a second lens, the first and second lens having a same focal length given by a first distance;

the first lens is located from the last GPOE by the first distance for receiving and directing the plurality of output light beams to the first aperture stop;

the first aperture stop is located from the first lens by the first distance;

the second aperture stop is located between the first aperture stop and the second lens; and the second lens is located from the first aperture stop by the first distance for receiving the two first-order diffracted light beams and directing the two first-order diffracted light beams to interfere on a plane located from the second lens by the first distance to thereby generate the second polarization interference pattern.

17. The apparatus of claim 16 further comprising:

a photoalignment substrate located on the plane for receiving the second polarization interference pattern, wherein the photoalignment substrate is configured to record the spatially-varying linear polarization orientation distribution upon irradiated by the plurality of filtered light beams sent out from the second lens.

* * * * *